(12) United States Patent
Kim

(10) Patent No.: US 10,406,904 B2
(45) Date of Patent: Sep. 10, 2019

(54) ENGINE MOUNT

(71) Applicants: Hyundai Motor Company, Seoul (KR); Kia Motors Corporation, Seoul (KR)

(72) Inventor: Seung Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/819,222

(22) Filed: Nov. 21, 2017

(65) Prior Publication Data

US 2019/0061509 A1 Feb. 28, 2019

(30) Foreign Application Priority Data

Aug. 24, 2017 (KR) .................. 10-2017-0107324

(51) Int. Cl.
- *B60K 5/12* (2006.01)
- *F16F 13/10* (2006.01)
- *F16F 13/26* (2006.01)

(52) U.S. Cl.
CPC .......... *B60K 5/1275* (2013.01); *F16F 13/105* (2013.01); *F16F 13/262* (2013.01); *F16F 13/107* (2013.01)

(58) Field of Classification Search
CPC .... B60K 5/1275; F16F 13/105; F16F 13/107; F16F 13/262
USPC ............ 267/140.11, 140.12, 140.13, 140.14, 267/140.15
See application file for complete search history.

(56) References Cited

U.S. PATENT DOCUMENTS

| | | | | | |
|---|---|---|---|---|---|
| 4,650,169 A | * | 3/1987 | Eberhard | ................ | F16F 13/26 267/140.13 |
| 4,699,099 A | * | 10/1987 | Arai | ...................... | F16F 13/262 123/192.1 |
| 5,407,169 A | * | 4/1995 | Tournier | ................. | F16F 13/26 248/562 |

(Continued)

FOREIGN PATENT DOCUMENTS

| | | | | |
|---|---|---|---|---|
| JP | 01120451 A | * | 5/1989 | ............. F16F 13/10 |
| JP | 04025636 A | * | 1/1992 | |

*Primary Examiner* — Robert A. Siconolfi
*Assistant Examiner* — San M Aung
(74) *Attorney, Agent, or Firm* — Slater Matsil, LLP

(57) ABSTRACT

Disclosed is an engine mount which includes a core installed in a case and supporting a load of an engine, an insulator mounted on the core and elastically deformed according to a load applied to the core, a diaphragm installed at a lower portion of the case, and an orifice assembly that divides a fluid-filled space between the insulator and the diaphragm into an upper liquid chamber and a lower liquid chamber and has at least one orifice for inducing a flow of fluid between the upper and lower liquid chambers, wherein the engine mount further includes a rubber membrane mounted between the orifice assembly and the insulator so as to be in close contact with a lower surface of the insulator, and wherein the orifice assembly includes a fluid transfer member for forcibly transferring a fluid, and operates according to driving conditions of a vehicle and selectively moves the fluid to the upper liquid chamber or the lower liquid chamber to regulate the liquid amount of the upper liquid chamber and the lower liquid chamber.

20 Claims, 4 Drawing Sheets

(56) References Cited

U.S. PATENT DOCUMENTS

| | | | | |
|---|---|---|---|---|
| 5,848,782 A | * | 12/1998 | Hein | F16F 9/342 |
| | | | | 267/140.11 |
| 6,357,730 B1 | * | 3/2002 | Gugsch | F16F 13/106 |
| | | | | 267/140.15 |
| 2003/0011116 A1 | * | 1/2003 | Kodama | F16F 13/26 |
| | | | | 267/140.13 |
| 2003/0151179 A1 | * | 8/2003 | Tewani | F16F 13/262 |
| | | | | 267/140.15 |

* cited by examiner

ENGINE MOUNT

CROSS-REFERENCE TO RELATED APPLICATIONS

This application claims priority to Korean Patent Application No. 10-2017-0107324, filed on Aug. 24, 2017 in the Korean Intellectual Property Office, which application is hereby incorporated herein by reference.

TECHNICAL FIELD

The present disclosure relates to an engine mount, and in particular embodiments to an engine mount capable of varying characteristics according to driving conditions of a vehicle.

BACKGROUND

Generally, in order to effectively reduce the vibration generated in an engine of a vehicle, the engine is installed in the vehicle through an engine mount. As this engine mount, a rubber mount for isolating and attenuating vibration through the elastic force of rubber and a fluid mount configured to seal hydraulic liquid are generally widely used.

In recent years, a semi-active mount, an active mount, and a magnetorheological fluid (MRF) mount have been developed and used in order to exhibit optimum performance in driving conditions of a vehicle. The semi-active mount and the active mount which are disclosed in Korean Patent Laid-open Publication No. 10-2013-0003749 have the advantage of improving NVH (noise, vibration, harshness) performance by reducing the dynamic characteristics. On the other hand, the MRF mount has the advantage of improving the ride comfort and handling performance by raising the dynamic characteristics.

However, there are problems in that the semi-active mount or the active mount can only control the dynamic characteristics by the on/off method and is bulky, and since the semi-active mount or the active mount transmits the force in the vertical direction, it is difficult to control due to the action of inertia resistance of the magnet.

The MRF mount has problems in that the price of MR fluid is expensive, and when it is left for a long time, the inner steel molecules sink and the dynamic characteristics are not variable.

SUMMARY

An embodiment according to the present disclosure provides an engine mount capable of varying the dynamic characteristics according to driving conditions of a vehicle to improve NVH, ride comfort and handling performance.

Additional aspects of the present disclosure will be set forth in part in the description which follows and, in part, will be obvious from the description, or may be learned by practice of the disclosure.

In accordance with one aspect of the present disclosure, there may be provided an engine mount which includes a core installed in a case and supporting a load of an engine, an insulator mounted on the core and elastically deformed according to a load applied to the core, a diaphragm installed at a lower portion of the case, and an orifice assembly that divides a fluid-filled space between the insulator and the diaphragm into an upper liquid chamber and a lower liquid chamber and has at least one orifice for inducing a flow of fluid between the upper and lower liquid chambers. The engine mount further includes a rubber membrane mounted between the orifice assembly and the insulator so as to be in close contact with a lower surface of the insulator. The orifice assembly includes a fluid transfer member for forcibly transferring a fluid, and operates according to driving conditions of a vehicle and selectively moves the fluid to the upper liquid chamber or the lower liquid chamber to regulate the liquid amount of the upper liquid chamber and the lower liquid chamber.

Further, when the fluid is moved from the upper liquid chamber to the lower liquid chamber, the rubber membrane may be spaced apart from the insulator, and the characteristic between the upper liquid chamber and the insulator may be changed from a fluid characteristic to a rubber characteristic.

Further, when the fluid is moved from the lower liquid chamber to the upper liquid chamber, the pressure of the upper liquid chamber may be increased, and the resistance force may be increased by the vibration.

Further, an air hole may be formed on the case and the insulator so that the air is communicated between the insulator and the rubber membrane.

Further, the orifice assembly may include a lower plate on which at least one lower orifice is formed in a radial direction with respect to a center thereof, an upper plate provided at an upper portion of the lower plate and on which at least one upper orifice is formed in a radial direction with respect to a center thereof, a fluid transfer member provided between the lower plate and the upper plate, and a motor installed at a lower portion of the lower plate to rotate the fluid transfer member, wherein the fluid transfer member may include a plurality of blades having a predetermined angle to generate a flow of fluid according to a direction of rotation by the motor.

Further, the lower plate may include a stepped portion to arrange the fluid transfer member at a center thereof.

Further, the lower orifice and the upper orifice may be formed to face each other with the fluid transfer member interposed therebetween.

Further, the lower plate may include a flow path groove provided in an annular shape along a periphery of the lower orifice to allow the fluid to flow from the upper liquid chamber to the lower liquid chamber or from the lower liquid chamber to the upper liquid chamber, and at least one first communication hole provided at a side of the flow path groove to communicate the flow path groove and the lower liquid chamber.

Further, the upper plate may include at least one second communication hole communicating the flow path groove and the upper liquid chamber.

Further, the lower plate may include an accommodation portion into which the motor is press-fitted at a lower surface thereof.

Further, the diaphragm may have a hollow ring shape, an edge thereof may be installed in the case, and a central portion thereof may be press-fitted into the accommodation portion.

Further, a rotation shaft of the motor may be provided to rotate the fluid transfer member and may be installed to pass through the centers of the lower plate, the fluid transfer member and the upper plate, and a fixing pin may be installed on the rotating shaft protruding from the upper plate to prevent the upper plate from being separated.

BRIEF DESCRIPTION OF THE DRAWINGS

The present disclosure will be described in detail with reference to the following drawings, which illustrate pre

DETAILED DESCRIPTION OF ILLUSTRATIVE EMBODIMENTS

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
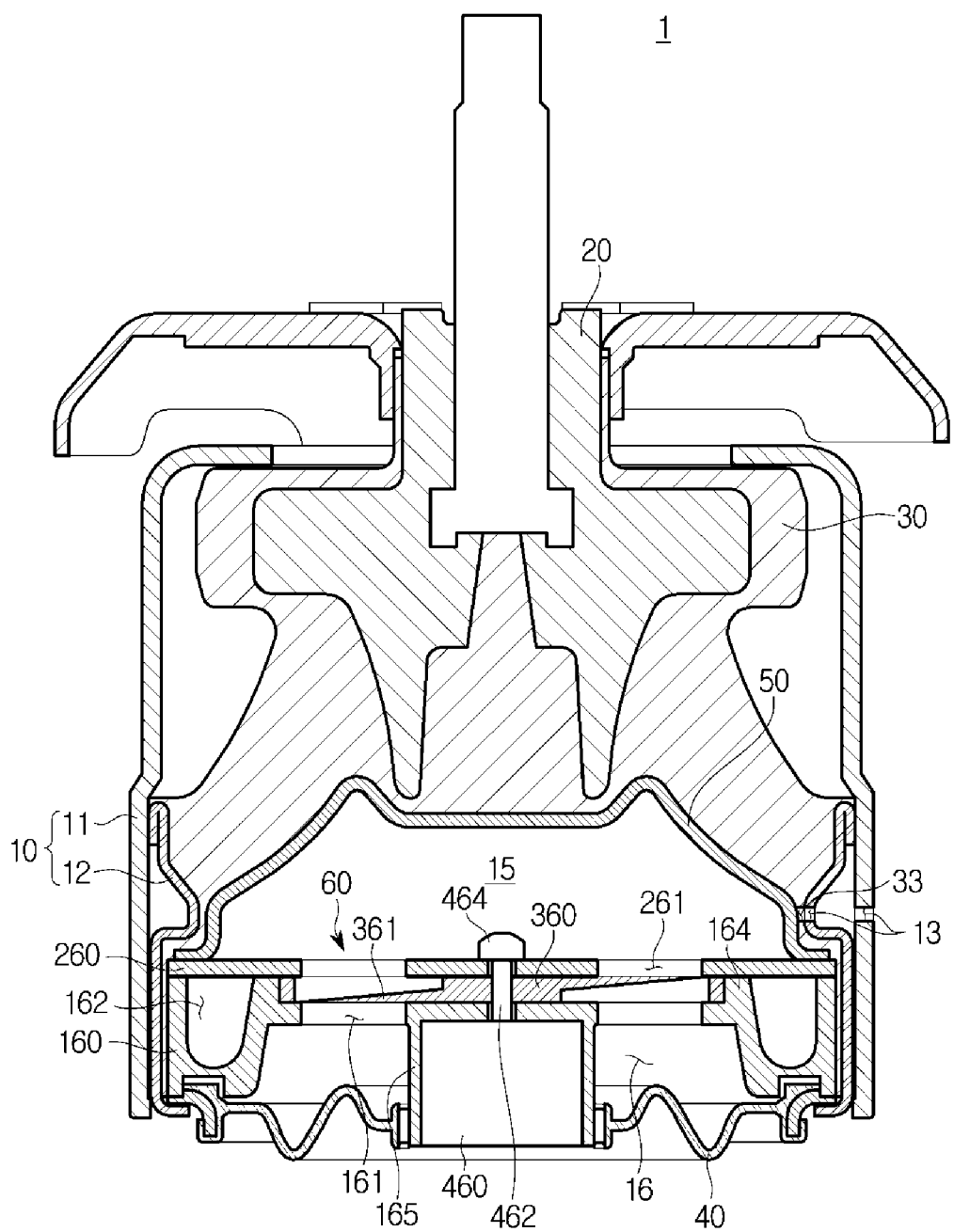
- FIG. 1 is a sectional view of an engine mount according to an embodiment of the present disclosure.
Figure 2:
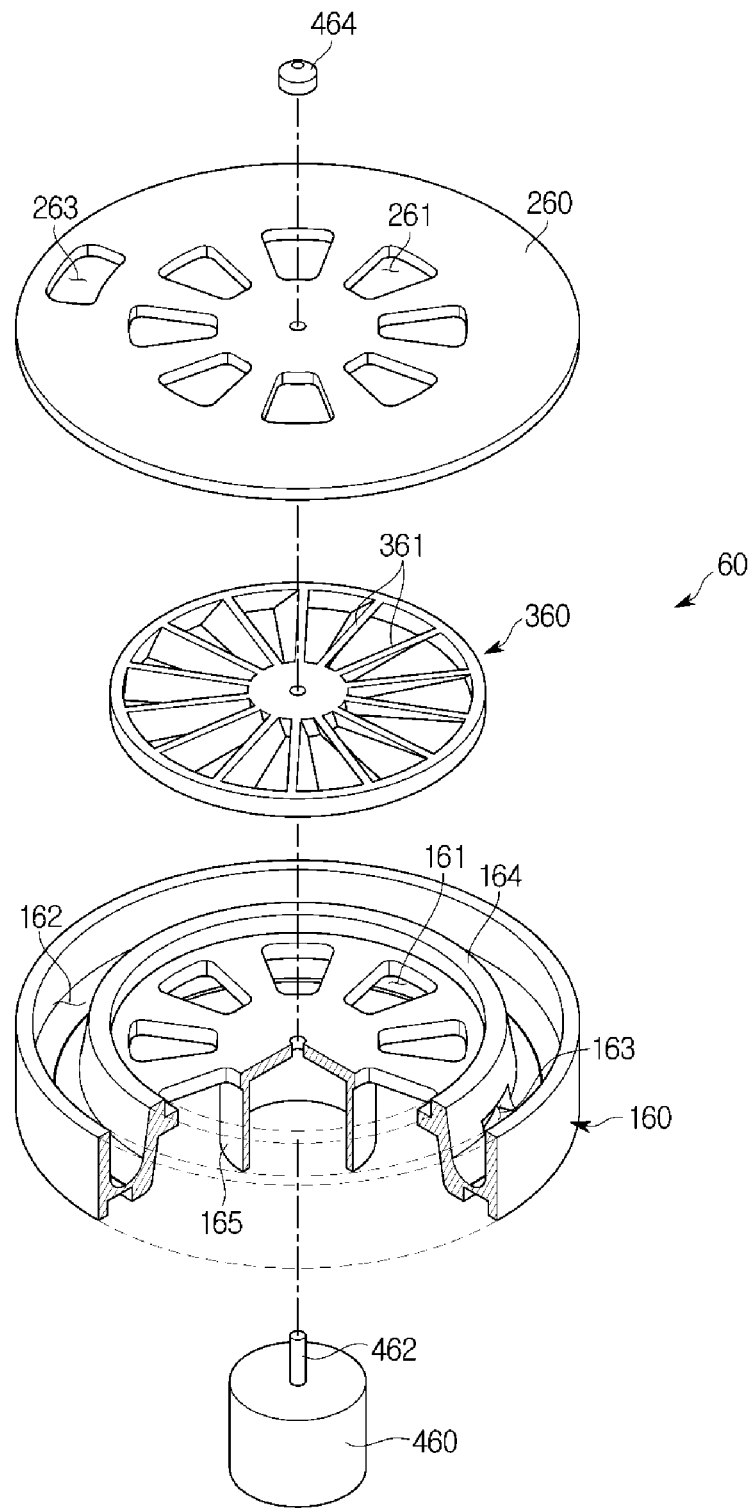
FIG. 2 is an exploded perspective view illustrating an orifice assembly included in an engine mount according to an embodiment of the present disclosure.

FIG. 1 is a sectional view of an engine mount according to an embodiment of the present disclosure, and FIG. 2 is an exploded perspective view illustrating an orifice assembly included in an engine mount according to an embodiment of the present disclosure.

Referring to FIGS. 1 and 2, an engine mount 1 according to an embodiment of the present disclosure has a structure in which a core 20 supporting a load of an engine (not shown), an insulator 30 installed on the core 20 to be elastically deformed according to the load and vibration transmitted to the core 20, and an orifice assembly 60 disposed at a lower portion of the insulator 30 are mounted to a case 10.

The case 10 includes an upper case 11 and a lower case 12 coupled to a lower end of the upper case 11. As shown in the drawing, the lower case 12 is formed in a hollow state and one end thereof is coupled to the insulator 30 to be installed in the upper case 11 and the other end thereof is coupled to the orifice assembly 60. As such, in a state where a lower portion of the lower case 12 is opened, a diaphragm 40 is coupled to the lower case 12 and the orifice assembly 60 to form a lower liquid chamber 16.

The core 20 and the insulator 30 are usually used in the engine mount 1, and thus a detailed description thereof will be omitted.

According to an aspect of the present disclosure, a rubber membrane 50 is provided to be in close contact with a lower surface of the insulator 30. The rubber membrane 50 is brought into close contact with or spaced apart from the insulator 30 by the orifice assembly 60, which will be described later, to vary a liquid amount of an upper liquid chamber 15. The function and effect of the rubber membrane 50 will be described below again.

The orifice assembly 60 is provided between the insulator 30 and the diaphragm 40, that is, between the rubber membrane 50 and the diaphragm 40. In addition, a fluid is filled between the rubber membrane 50 and the diaphragm 40. The orifice assembly 60 divides a space in which a fluid is filled into the upper liquid chamber 15 and the lower liquid chamber 16, and has orifices 161 and 261 for inducing a flow of fluid between the upper liquid chamber 15 and the lower liquid chamber 16. More specifically, the orifice assembly 60 includes a lower plate 160, an upper plate 260 provided on an upper portion of the lower plate 160, a fluid transfer member 360 provided between the lower plate 160 and the upper plate 260, and a motor 460 installed on a lower portion of the lower plate 160 to rotate the fluid transfer member 360.

The lower plate 160 includes the at least one lower orifice 161 communicating with the lower liquid chamber 16. As shown in the drawing, the at least one lower orifice 161 is formed of a plurality of orifices to be spaced apart from each other by a predetermined distance in a radial direction with respect to a center of the lower plate 160. In addition, the lower plate 160 includes a flow path groove 162 provided in an annular shape along a periphery of the lower orifices 161, at least one first communication hole 163 formed at a side of the flow path groove 162 to communicate the lower liquid chamber 16 and the flow path groove 162, a stepped portion 164 which is stepped to accommodate the fluid transfer member 360, and an accommodation portion 165 in which the motor 460 is installed.

The flow path groove 162 is formed in an annular shape along a periphery of the lower orifices 161, and allows a fluid to flow from the upper liquid chamber 15 to the lower liquid chamber 16 or from the lower liquid chamber 16 to the upper liquid chamber 15.

The at least one first communication hole 163 is formed at a side of the flow path groove 162 in the direction toward the lower liquid chamber 16 to communicate with the lower liquid chamber 16. In addition, the number and size of the first communication holes 163 is formed to be smaller than the number and size of the lower orifices 161.

The stepped portion 164 is formed to be stepped so that the fluid transfer member 360 is disposed at a center of the lower plate 160. That is, a central portion of the lower plate 160 is stepped to seat the fluid transfer member 360. In addition, the lower orifices 161 are formed at the stepped surface where the fluid transfer member 360 is seated.

The accommodation portion 165 is formed to protrude downward from a lower surface of the lower plate 160. The accommodation portion 165 has a cylindrical shape so that the motor 460 is press-fitted. In addition, the accommodation portion 165 is provided at a lower center portion of the lower plate 160 so that the motor 460 is positioned at a center.

The upper plate 260 is formed to cover an upper surface of the lower plate 160 and has a diameter corresponding to a diameter of the lower plate 160. The upper plate 260 includes at least one upper orifice 261 communicating with the upper liquid chamber 15 and a second communication hole 263 provided to communicate with the flow path groove 162 and the upper liquid chamber 15.

The at least one upper orifice 261 is formed at a central portion of the upper plate 260. As shown in the drawing, the at least one upper orifice 261 is formed of a plurality of orifices to be spaced apart from each other by a predetermined distance in a radial direction with respect to a center of the upper plate 260. The upper orifices 261 are formed at positions corresponding to the lower orifices 161 and are arranged to face each other.

The second communication hole 263 is formed so that the flow path groove 162 and the upper liquid chamber 15 communicate with each other. That is, as the first communication hole 163 communicates with the lower liquid chamber 16 and the flow path groove 162 and the second communication hole 263 communicates with the upper liquid chamber 15 and the flow path groove 162, the upper liquid chamber 15 and the lower liquid chamber 16 can communicate with each other through the flow path groove 162. In addition, the upper liquid chamber 15 and the lower liquid chamber 16 can communicate with each other by the upper orifices 261 and the lower orifices 161 described above. The structure in which the upper liquid chamber 15 and the lower liquid chamber 16 are communicated (the position and the number and size of the orifices and the holes) is intended to easily vary the dynamic characteristics by controlling a fluid flow and a flow rate, and will be described below again.

The fluid transfer member 360 is disposed between the lower plate 160 and the upper plate 260. As shown in the drawing, the fluid transfer member 360 is accommodated in the stepped portion 164 of the lower plate 160 and rotated by the motor 460. The fluid transfer member 360 performs a function of forcibly transferring a fluid as it is rotated. The fluid transfer member 360 includes a plurality of blades 361 having a predetermined angle to generate a flow of fluid according to a direction rotated by the motor 460. For example, the fluid transfer member 360 may be configured to have a propeller or fan structure. Accordingly, the fluid transfer member 360 is rotated in a rotation direction of the motor 460, that is, clockwise or counterclockwise, and transfers a fluid upward or downward.

In addition, since the fluid transfer member 360 is disposed between the lower orifices 161 and the upper orifices 261, the transfer of a fluid from the lower liquid chamber 16 to the upper liquid chamber 15 or from the upper liquid chamber 15 to the lower liquid chamber 16 is facilitated.

The motor 460 performs a function of rotating the fluid transfer member 360 by rotating in the forward and reverse directions. A rotating shaft 462 of the motor 460 may penetrate the lower plate 160 and be installed at a center of the fluid transfer member 360 so that the motor 460 is press-fitted into the accommodation portion 165 to transmit a rotational force to the fluid transfer member 360. In addition, the rotating shaft 462 is provided to penetrate through the lower plate 160, the fluid transfer member 360 and the upper plate 260, and a fixing pin 464 is provided at an end of the rotating shaft 462 protruding through the upper plate 260 to prevent the upper plate 260 from being separated. Accordingly, the orifice assembly 60 may be provided as a single integrated subassembly, which is advantageous in that the assemblability in manufacturing the engine mount 1 is improved.

The diaphragm 40 has a hollow ring shape at its center. Accordingly, the edge of the diaphragm 40 is installed in the case 10, and a center portion thereof is press-fitted into the accommodation portion 165.

Air holes 13 and 33 are formed on the case 10 and the insulator 30, respectively, so that a gap between the insulator 30 and the rubber membrane 50 communicate with the atmosphere. The air holes 13 and 33 are communicated with the atmosphere so that the rubber membrane 50 can easily move.

Hereinafter, an operation state in which the engine mount 1 operates in accordance with driving conditions and attenuates vibration and noise, and improves ride comfort and handling performance will be described.

First, under normal driving conditions, the engine mount 1 is provided in a state in which the fluid transfer member 360 is not operated as shown in FIG. 1. When driving a vehicle in this state, a fluid in the upper liquid chamber 15 passes through the flow path groove 162 through the second communication hole 263, so that the engine mount 1 has attenuation characteristics. As a result, the performance of the secondary ride shake due to the engine behavior can be improved.

Figure 3:
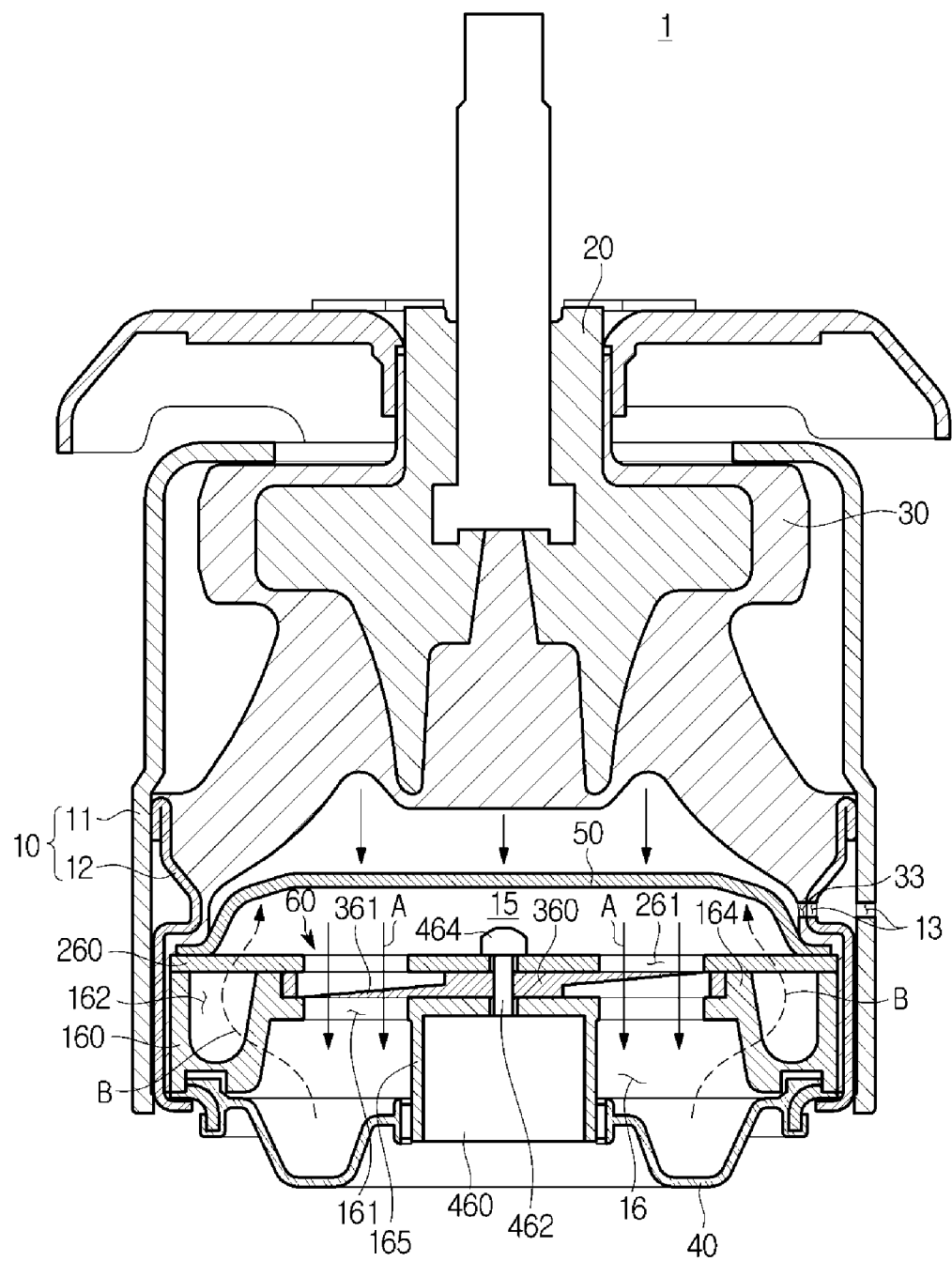
FIG. 3 is a view illustrating a state in which an engine mount according to an embodiment of the present disclosure is operated to improve NVH performance.

Next, the operation state of the engine mount 1 under the NVH improvement condition will be described with reference to FIG. 3. When an engine idles (vibration of a high-frequency band), since a driver feels only the vibration transmitted from the engine, minimizing the vibration input from the engine is important. That is, in order to maximize the insulation rate of the engine mount 1, which is the transmission system of the engine and the vehicle body, a rubber mount is advantageous compared to a fluid mount. This is because the dynamic characteristics of the fluid mount are high and the dynamic characteristics of the rubber mount are low.

Accordingly, the fluid transfer member 360 is rotated clockwise through the motor 460 to forcibly transfer the fluid in the upper liquid chamber 15 to the lower liquid chamber 16. Accordingly, as the rubber membrane 50 is separated from the insulator 30, the volume of the upper liquid chamber 15 is reduced and the fluid mount is changed to the rubber mount. In addition, the diaphragm 40 is inflated by the fluid forcibly transferred to the lower liquid chamber 16 to receive the fluid according to the increased volume. That is, the NVH performance can be improved according to the downward dynamic characteristics. That is, in order to maintain the NVH improvement, the fluid transfer member 360 must be continuously rotated.

Describing the fluid flow structure more specifically, the fluid is transferred from the upper liquid chamber 15 to the lower liquid chamber 16 through the upper orifices 261 and the lower orifices 161 located at a center portion according to the operation of the fluid transfer member 360. That is, the fluid is delivered in the direction of an arrow A. The fluid delivered to the lower liquid chamber 16 is transferred back to the upper liquid chamber 15 through the first communication holes 163, the flow path groove 162, and the second communication holes 263. That is, the fluid is transferred back in the direction of an arrow B. At this time, since the path of fluid sequentially transferred through the first communication holes 163, the flow path groove 162, and the second communication holes 263 is longer compared with the path of fluid delivered through the upper orifices 261 and the lower orifices 161, the fluid resistance causes the return to the original state to be slow. In addition, since the size and number of the second and first communication holes 263 and 163 are smaller compared with the size and the number of the upper and lower orifices 261 and 161, the flow amount to be returned to the original state is smaller than the flow rate to be delivered.

On the other hand, the rubber membrane 50 can be easily moved by the air holes 13 and 33 formed on the case 10 and the insulator 30, thereby facilitating the conversion from the fluid mount to the rubber mount.

Figure 4:
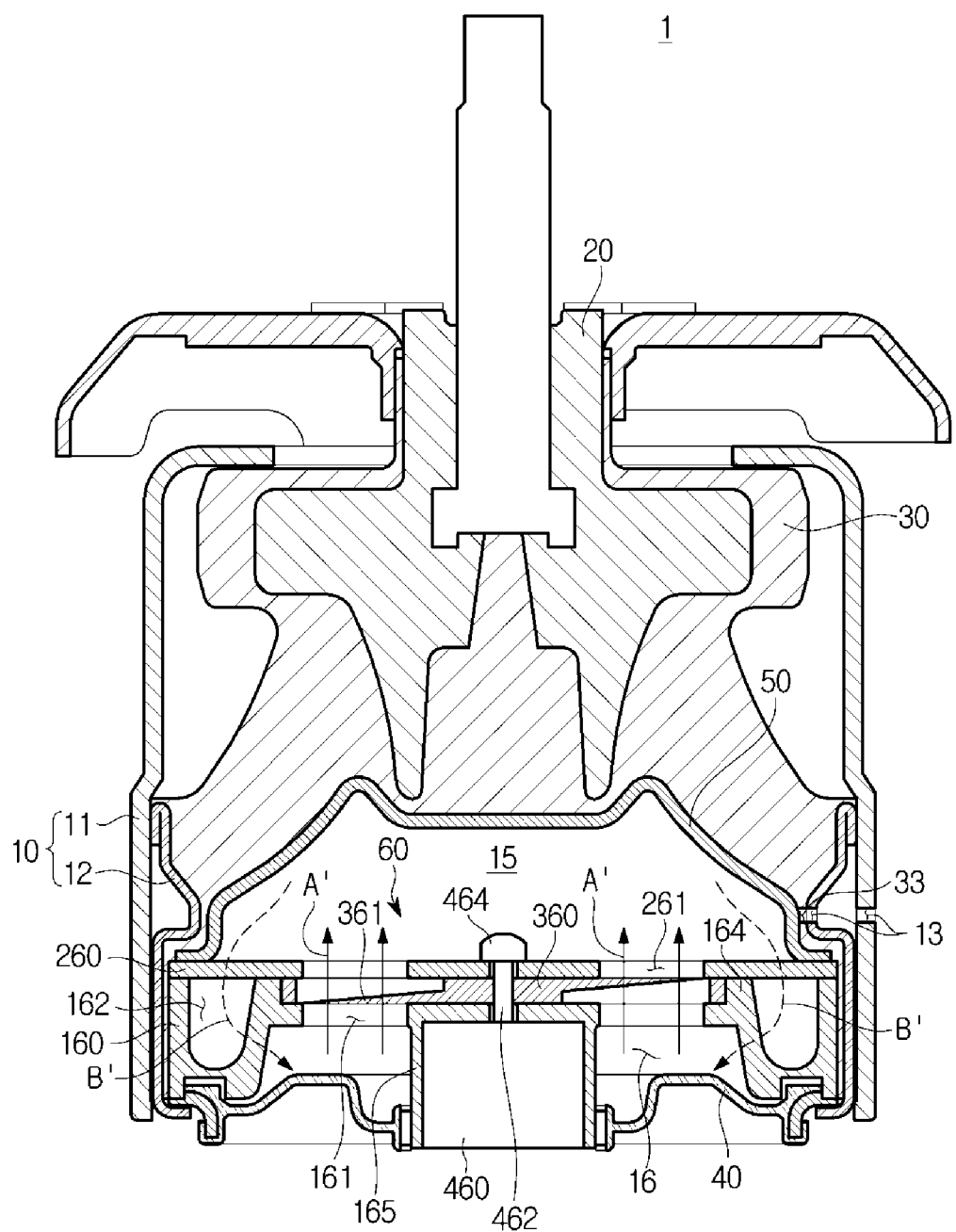
FIG. 4 is a view illustrating a state in which an engine mount according to an embodiment of the present disclosure is operated to improve ride comfort and handling performance.

Next, the operation state of the engine mount 1 in the ride comfort and handling improvement conditions will be described with reference to FIG. 4. If the dynamic characteristics are lowered when cornering or sudden driving during operation of the vehicle, the relative motion of the engine mount 1 with respect to the vehicle body becomes large to reduce the sense of unity with the vehicle body, thereby reducing the operability. Therefore, the dynamic characteristics must be improved.

Accordingly, the fluid transfer member 360 is rotated counterclockwise through the motor 460 to forcibly transfer the fluid in the lower liquid chamber 16 toward the upper liquid chamber 15. As a result, as the liquid pressure of the upper liquid chamber 15 increases, the resistance of the upper liquid chamber 15 against vibration (pressing force) increases, and the static characteristics and the dynamic characteristics are improved, thereby improving ride comfort and handling performance. In order to maintain such variable dynamic characteristics, that is, ride comfort and handling improvement, the fluid transfer member 360 must be continuously rotated.

Describing the fluid flow structure more specifically, the fluid is transferred from the lower liquid chamber 16 to the upper liquid chamber 15 through the lower orifices 161 and the upper orifices 261 located at a center portion according to the operation of the fluid transfer member 360. That is, the fluid is delivered in the direction of an arrow A'. The fluid delivered to the upper liquid chamber 15 is transferred back to the lower liquid chamber 16 through the second communication holes 263, the flow path groove 162, and the first communication holes 163. That is, the fluid is transferred back in the direction of an arrow B'. At this time, since the path of fluid sequentially transferred through the second communication holes 263, the flow path groove 162, and the first communication holes 163 is longer compared with the path of fluid delivered through the lower orifices 161 and the upper orifices 261, the fluid resistance causes the return to the original state to be slow. In addition, since the size and number of the second and first communication holes 263 and 163 are smaller compared with the size and the number of the upper and lower orifices 261 and 161, the flow amount to be returned to the original state is smaller than the flow rate to be delivered.

As described above, since the fluid is moved through the fluid transfer member 360, the characteristics are generated linearly. Further, in order to maintain the characteristics when varying the dynamic characteristics, the fluid transfer member 360 must be continuously rotated. At this time, since the rubber membrane 50 only needs to be separated from the insulator 30 at the time of NVH improvement, it is sufficient that the amount of fluid forcedly delivered by the fluid transfer member 360 is larger than the fluid amount returned to the original state through the flow path groove 162. However, when improving ride comfort and handling, in a case where the turning speed of the vehicle is large or the suddenly-driving speed increases, the rotational speed of the fluid transfer member 360 should be increased. That is, it is necessary to further increase the dynamic characteristics by increasing the forced delivery amount of the fluid. This control can maintain the ride comfort and handling performance improvement by controlling the rotational speed of the motor 460.

As is apparent from the above, an engine mount according to an embodiment of the present disclosure can improve the NVH, ride comfort and handling performance by varying the dynamic characteristics according to the driving conditions of a vehicle such as normal driving, idling of an engine, sudden driving or sudden turning. That is, an engine mount of the present disclosure has the effects of achieving both the performances of the existing active mount and MRF mount, as well as of reducing costs such as the manufacturing cost and the additional consumable cost.

While the present disclosure has been particularly shown and described with reference to the exemplary embodiments thereof, it will be understood by those skilled in the art that the present disclosure may be variously modified and changed without departing from the technical idea of the present disclosure provided by the following claims.

What is claimed is:

1. An engine mount comprising:
    a case;
    a core installed in the case;
    an insulator mounted on the core and elastically deformed according to a load applied to the core;
    a diaphragm installed at a lower portion of the case;
    an orifice assembly that divides a fluid-filled space between the insulator and the diaphragm into an upper liquid chamber and a lower liquid chamber, the orifice assembly having an orifice for inducing a flow of fluid between the upper and lower liquid chambers, wherein the orifice assembly includes a fluid transfer member for forcibly transferring a fluid, the fluid transfer member configured to operate according to driving conditions of a vehicle and selectively move the fluid to the upper liquid chamber or the lower liquid chamber to regulate an amount of fluid in the upper liquid chamber and the lower liquid chamber, wherein the orifice assembly is configured to that when the fluid is moved from the lower liquid chamber to the upper liquid chamber, a pressure of the upper liquid chamber is increased, and a resistance force is increased by a vibration; and
    a rubber membrane mounted between the orifice assembly and the insulator so as to be in close contact with a lower surface of the insulator.

2. The engine mount according to claim 1, wherein the orifice assembly is configured to that when the fluid is moved from the upper liquid chamber to the lower liquid chamber, the rubber membrane is spaced apart from the insulator, and a dynamic characteristic between the upper liquid chamber and the insulator is changed from a fluid dynamic characteristic to a rubber dynamic characteristic.

3. The engine mount according to claim 1, wherein an air hole is formed on the case and the insulator so that air is communicated between the insulator and the rubber membrane.

4. The engine mount according to claim 1, wherein the orifice assembly comprises:
    a lower plate on which a plurality of lower orifices are formed in a radial direction with respect to a center thereof;
    an upper plate provided at an upper portion of the lower plate and on which a plurality of upper orifices are formed in a radial direction with respect to a center thereof, wherein the fluid transfer member is provided between the lower plate and the upper plate; and
    a motor installed at a lower portion of the lower plate to rotate the fluid transfer member.

5. An engine mount comprising:
    a case;
    a core installed in the case;
    an insulator mounted on the core and elastically deformed according to a load applied to the core;
    a diaphragm installed at a lower portion of the case;
    an orifice assembly that divides a fluid-filled space between the insulator and the diaphragm into an upper liquid chamber and a lower liquid chamber, the orifice assembly having an orifice for inducing a flow of fluid between the upper and lower liquid chambers, wherein the orifice assembly includes a fluid transfer member for forcibly transferring a fluid, the fluid transfer member configured to operate according to driving conditions of a vehicle and selectively move the fluid to the upper liquid chamber or the lower liquid chamber to regulate an amount of fluid in the upper liquid chamber and the lower liquid chamber; and a rubber membrane mounted between the orifice assembly and the insulator so as to be in close contact with a lower surface of the insulator wherein the orifice assembly comprises:

a lower plate on which a plurality of lower orifices are formed in a radial direction with respect to a center thereof;

an upper plate provided at an upper portion of the lower plate and on which a plurality of upper orifices are formed in a radial direction with respect to a center thereof, wherein the fluid transfer member is provided between the lower plate and the upper plate; and a motor installed at a lower portion of the lower plate to rotate the fluid transfer member; and wherein the fluid transfer member comprises a plurality of blades having a predetermined angle to generate a flow of fluid according to a direction of rotation by the motor.

6. The engine mount according to claim 5, wherein the lower plate comprises a stepped portion to arrange the fluid transfer member at a center thereof.

7. The engine mount according to claim 5, wherein the lower orifices and the upper orifices are formed to face each other with the fluid transfer member interposed therebetween.

8. The engine mount according to claim 5, wherein the lower plate comprises a flow path groove provided in an annular shape along a periphery of the lower orifices to allow the fluid to flow from the upper liquid chamber to the lower liquid chamber or from the lower liquid chamber to the upper liquid chamber, and a first communication hole provided at a side of the flow path groove to communicate the flow path groove and the lower liquid chamber.

9. The engine mount according to claim 8, wherein the upper plate comprises a second communication hole communicating with the flow path groove and the upper liquid chamber.

10. The engine mount according to claim 5, wherein the lower plate comprises an accommodation portion into which the motor is press-fitted at a lower surface thereof.

11. The engine mount according to claim 10, wherein the diaphragm has a hollow ring shape, an edge of the diaphragm being installed in the case, and a central portion of the diaphragm being press-fitted into the accommodation portion.

12. The engine mount according to claim 5, wherein a rotation shaft of the motor is provided to rotate the fluid transfer member and is installed to pass through the centers of the lower plate, the fluid transfer member and the upper plate, and a fixing pin is installed on the rotating shaft protruding from the upper plate to prevent the upper plate from being separated.

13. An engine mount comprising:

a core installed in a case;

an insulator mounted on the core and elastically deformed according to a load applied to the core;

a diaphragm installed at a lower portion of the case, a fluid-filled space located between the insulator and the diaphragm;

a lower plate located within the fluid-filled space, the lower plate including a plurality of lower orifices being formed in a radial direction with respect to a center of the lower plate;

an upper plate provided at an upper portion of the lower plate, the upper plate including a plurality of upper orifices formed in a radial direction with respect to a center of the upper plate;

a fluid transfer member provided between the lower plate and the upper plate, the fluid transfer member configured to operate according to driving conditions of a vehicle and selectively move fluid to an upper liquid chamber of the fluid-filled space or a lower liquid chamber of the fluid-filled space to regulate and amount of fluid of the upper liquid chamber and the lower liquid chamber;

a motor installed at a lower portion of the lower plate to rotate the fluid transfer member, wherein the fluid transfer member comprises a plurality of blades having a predetermined angle to generate a flow of fluid according to a direction of rotation by the motor; and a rubber membrane mounted between the upper plate and the insulator so as to be in close contact with a lower surface of the insulator.

14. The engine mount according to claim 13, wherein the lower plate comprises a stepped portion to arrange the fluid transfer member at a center thereof.

15. The engine mount according to claim 13, wherein the lower orifices and the upper orifices are formed to face each other with the fluid transfer member interposed therebetween.

16. The engine mount according to claim 13, wherein the lower plate comprises a flow path groove provided in an annular shape along a periphery of the lower orifices to allow the fluid to flow from the upper liquid chamber to the lower liquid chamber or from the lower liquid chamber to the upper liquid chamber, and a first communication hole provided at a side of the flow path groove to communicate the flow path groove and the lower liquid chamber.

17. The engine mount according to claim 16, wherein the upper plate comprises a second communication hole communicating with the flow path groove and the upper liquid chamber.

18. The engine mount according to claim 13, wherein the lower plate comprises an accommodation portion into which the motor is press-fitted at a lower surface thereof.

19. The engine mount according to claim 13, wherein a rotation shaft of the motor is provided to rotate the fluid transfer member and is installed to pass through the centers of the lower plate, the fluid transfer member and the upper plate, and a fixing pin is installed on the rotating shaft protruding from the upper plate to prevent the upper plate from being separated.

20. The engine mount according to claim 4, wherein the fluid transfer member comprises a plurality of blades having a predetermined angle to generate a flow of fluid according to a direction of rotation by the motor.

* * * * *